(12) United States Patent
Ackerman (10) Patent No.: US 6,246,500 B1
(45) Date of Patent: Jun. 12, 2001

(54) LINEARIZATION OF A BROADBAND ANALOG OPTICAL LINK USING TWO WAVELENGTHS

(75) Inventor: Edward Ackerman, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/156,914

(22) Filed: Sep. 18, 1998

(51) Int. Cl.$^7$ .......................... H04B 10/00; H04B 10/18
(52) U.S. Cl. ............................. 359/161; 359/154
(58) Field of Search ........................... 359/154, 164, 359/161, 168, 133, 189, 180, 125, 181, 173, 175

(56) References Cited

U.S. PATENT DOCUMENTS

| | | | |
|---|---|---|---|
| 5,253,309 | * 10/1993 | Nazarathy | 385/4 |
| 5,289,550 | 2/1994 | Plastow . | |
| 5,373,383 | * 12/1994 | LaGasse | 359/161 |
| 5,532,857 | 7/1996 | Gertel et al. . | |
| 5,777,777 | 7/1998 | Kaste et al. . | |
| 5,940,196 | * 8/1999 | Piehler et al. | 359/133 |

OTHER PUBLICATIONS

Patent Cooperation Treaty, International Search Report, International Application No. PCT/US 99/21431, mailed on Jan. 24, 2000, 7 pages.

Betts, G.E., et al. "Microwave Analog Optical Links Using Suboctave Linearized Modulators," *IEEE Photonics Technology Letters*, vol. 8, No. 9, Sep. 1996, pp. 1273–1275.

Bridges, William B., et al. "Distortion in Linearized Electrooptic Modulators," *IEEE Transactions on Microwave Theory and Techniques*, vol. 43, No. 9, Sep. 1995, pp. 2184–2197.

Farwell, Mark L., et al., "An Electrooptic Intensity Modulator with Improved Linearity," *IEEE Photonics Technology Letters*, vol. 3, No. 9, Sep. 1991, pp. 792–795.

Kaminow, Ivan P. "Optical Waveguide Modulators," *IEEE Transactioins on Microwave Theory and Techniques*, vol. MTT–23, No. 1, Jan. 1975, pp. 57–69.

Korotky, Steven K., et al., "Dual Parallel Modulation Schemes for Low–Distortion Analog Optical Transmission," *IEEE Journal on Selected Areas in Communications*, vol. 8, No. 7, Sep. 1990, pp. 1377–1381.

Chraplyvy, A.R., et al. "One–Third Terabit/s Transmission Through 150 km of Dispersion–Managed Fiber," *IEEE Photonics Technology Letters*, vol. 7, No. 1, Jan. 1995, pp. 98–100.

Kurazono, Sadao, et al. "A New Optical Modulator Consisting of Coupled Optical Waveguides," *Electronics and Communications in Japan*, vol. 55–C, No. 1, 1972, pp. 103–1096.

Liu, Pao–Lo, et al. "In Search of a Linear Electooptic Amplitude Modulator," *IEEE Photonics Technology Letters*, vol. 3, No. 2, Feb. 1991, pp. 144–146.

(List continued on next page.)

*Primary Examiner*—Leslie Pascal
*Assistant Examiner*—Agustin Bello (57) ABSTRACT

A modulator driven by an externally applied RF signal intensity modulates carrier signals at different wavelengths. The modulator bias voltage and the ratio of the optical powers of the carrier signals are selected to minimize second and third order distortion. The modulated signals are separately detected and the resulting electrical signals are combined to yield a linearized representation of the RF signal. An electro-optic device capable of wavelength multiplexing and demultiplexing can independently and jointly control the bias voltages for the transfer functions of the two carrier signals.

13 Claims, 8 Drawing Sheets

OTHER PUBLICATIONS

Skeie, Halvor, et al. "Linearization of Electro–Optic Modulators by a Cascade Coupling of Phase Modulating Electrodes," *SPIE vol. 1583 Integrated Optical Circuits (1991)* pp. 153–164.

Tong, D., "Multiwavelength microwave photonic systems– Beyond fundamental RIN–limited performance," CLEO '97, CLEO, pp. 295–296.*

Goldsmith, C.L., "Principles and Performance of Traveling– Wave Photodetector Arrays," Aug. 1997, IEEE Transactions On Microwave Theory And Techniques, vol. 45, No. 8, pp 1345, Figure 7.*

Helkey, R., "A Down–Conversion Optical Link with RF Gain," Jun. 1997, Journal of Lightwave Technology, vol. 15, No. 6, pp 956–961.*

* cited by examiner

LINEARIZATION OF A BROADBAND ANALOG OPTICAL LINK USING TWO WAVELENGTHS

STATEMENT REGARDING FEDERALLY SPONSORED RESEARCH

This invention was made with government support under Contract Number F19628-95-C-0002 awarded by the U.S. Air Force. The government has certain rights in the invention.

FIELD OF THE INVENTION

The invention relates generally to a method and apparatus for a communications system. In particular, the invention relates to a method for linearizing a signal transmitted over a communication link.

BACKGROUND OF THE INVENTION

Analog fiber-optic links with dynamic ranges free of spurious signals can be achieved using either direct or external modulation methods and can be assembled entirely from components that are commercially available. Using optical fiber to remotely locate radio frequency (RF) antennas for high performance communication links, however, can require a dynamic range of 125 dB·Hz or more in conjunction with a low noise figure (i.e., less than 5 dB).

External modulation of a carrier creates a modulated signal having a combination of high dynamic range and low noise figure more readily than direct modulation of the carrier because it permits the use of very low-noise solid-state lasers that cannot be modulated directly at RF frequencies. To extend the dynamic range beyond the 115 dB·Hz achievable using commercially available Mach-Zehnder lithium niobate modulators, an improvement in modulator linearity must be realized. The dynamic range of an external modulation link is limited by the nonlinearity of the modulator transfer function (i.e., the relationship between the optical output power and the signal voltage applied to the modulator). This nonlinearity causes a distortion in the modulated signal that increases with increasing signal voltage.

Electro-optic modulators utilizing the electroabsorptive effect can have very linear transfer functions. Unfortunately, electroabsorption modulators yield significant noise figures because they cannot operate at optical input powers greater than a few milliwatts. Communication links with lower noise figures are obtained using external modulation of higher CW optical carrier powers (i.e., at least 100 mW). Currently the only type of optical modulator that generally can operate at these higher power levels is a lithium niobate device based on the linear electro-optic effect (i.e., Pockels effect). Conversion of the linear modulation of the refractive index into a modulation of optical intensity is achieved using an interferometer or a directional coupler, however, either conversion method results in a nonlinear transfer function. The result of a nonlinear transfer function is the generation of harmonic and intermodulation distortions that degrade the modulated signal.

Dynamic ranges in analog optical communication links in excess of 115 dB·Hz have been achieved using specially designed electro-optic modulators that minimize one or more orders of harmonic and intermodulation distortion. Currently, however, improved dynamic ranges of approximately 125 dB·Hz using these linearized modulators have been achieved only for frequencies less than 1 GHz. In addition, linearization across more than an octave bandwidth requires precise balancing of the signal voltage levels on multiple electrodes in the custom modulator, thus providing a significant implementation challenge.

SUMMARY OF THE INVENTION

The present invention relates to a method and apparatus for linearizing a signal transmitted over a communication link. The method and apparatus in one embodiment make use of a commercially available Mach-Zehnder electro-optic modulator having a single traveling-wave RF electrode and a single DC bias electrode. The DC bias is one parameter that is controlled to affect the relative levels of signal and distortion. In order to minimize both second and third order distortion, a second parameter must also be controlled. The halfwave voltage ($V_\pi$) of a Mach-Zehnder modulator is a measure of the periodicity (i.e., sensitivity) of the modulator transfer function with respect to the modulator input voltage. Because the halfwave voltage is proportional to the optical wavelength, different wavelengths will have different transfer function periodicities. Multiple carriers at different wavelengths can be modulated and individually detected after spectral separation. If a specific ratio of optical powers (i.e., the second control parameter) at the different wavelengths is established, the detected signals can be combined to create a modulation transfer function having null second and third derivatives at a single DC bias voltage.

The present invention features a method of linearizing a signal transmitted over a communication link which includes the steps of supplying a first signal and a second signal at a first wavelength and a second wavelength, respectively. The first and second wavelengths can be optical wavelengths. The method also includes the steps of modulating each signal differentially with respect to the other signal to obtain respective modulated signals, detecting the modulated signals, and performing a linear operation on the detected signals. The linear operation in various embodiments includes summing or differencing the detected signals.

The invention also features a method of linearizing a received RF signal which includes the steps of supplying a first and a second signal at a first and a second wavelength, respectively, and modulating the signals differentially with respect to each other in response to the received RF signal to obtain respective modulated signals. The method includes the additional steps of detecting the modulated signals and performing a linear operation on the detected signals to generate a received linearized signal.

In another aspect, the invention features a system for providing a linearized signal over a communication link. The system includes a first and a second source producing a first and a second signal, respectively, at a first and a second wavelength, respectively. The system also includes a modulator, a first and a second detector, and a processor. The modulator is in optical communication with the source outputs and differentially modulates the first and second signals. Each detector is in optical communication with a respective modulator output and produces an electrical signal in response to the respective modulated signals. The processor is in electrical communication with the electrical signals from the detectors and performs a linear operation on them to generate a linearized output signal. In one embodiment, the system includes a wavelength division multiplexer in communication with the source outputs. In another embodiment, the system includes a wavelength division demultiplexer in communication with the modulator outputs.

The invention also features a modulator having a first modulator input, a second modulator input, a first splitter, a second splitter, and a signal electrode. The first splitter and the second splitter each have an input, and a first and a second output. The inputs of the first and the second splitter are in communication with the first and the second modulator inputs, respectively. The signal electrode is in close proximity to the first output of each splitter. The modulator can also include a first combiner and a second combiner, each combiner having a first and a second input, and an output. The first and second inputs of the first combiner are in communication with the first and second outputs of the first splitter, respectively. The first and second inputs of the second combiner are in communication with the first and second outputs of the second splitter, respectively.

The modulator can include a first ground electrode in close proximity to the signal electrode. In one embodiment, the modulator also includes a second ground electrode in close proximity to the signal electrode. In another embodiment, the modulator includes a first bias electrode located adjacent to the first outputs of the first and second splitters. In yet another embodiment, the modulator includes a second bias electrode located adjacent to the second output of the second splitter. In yet another embodiment, the modulator includes an optical element such that the outputs of the splitters are optically coupled to the respective inputs of the combiners.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

DETAILED DESCRIPTION OF THE INVENTION

Figure 1:
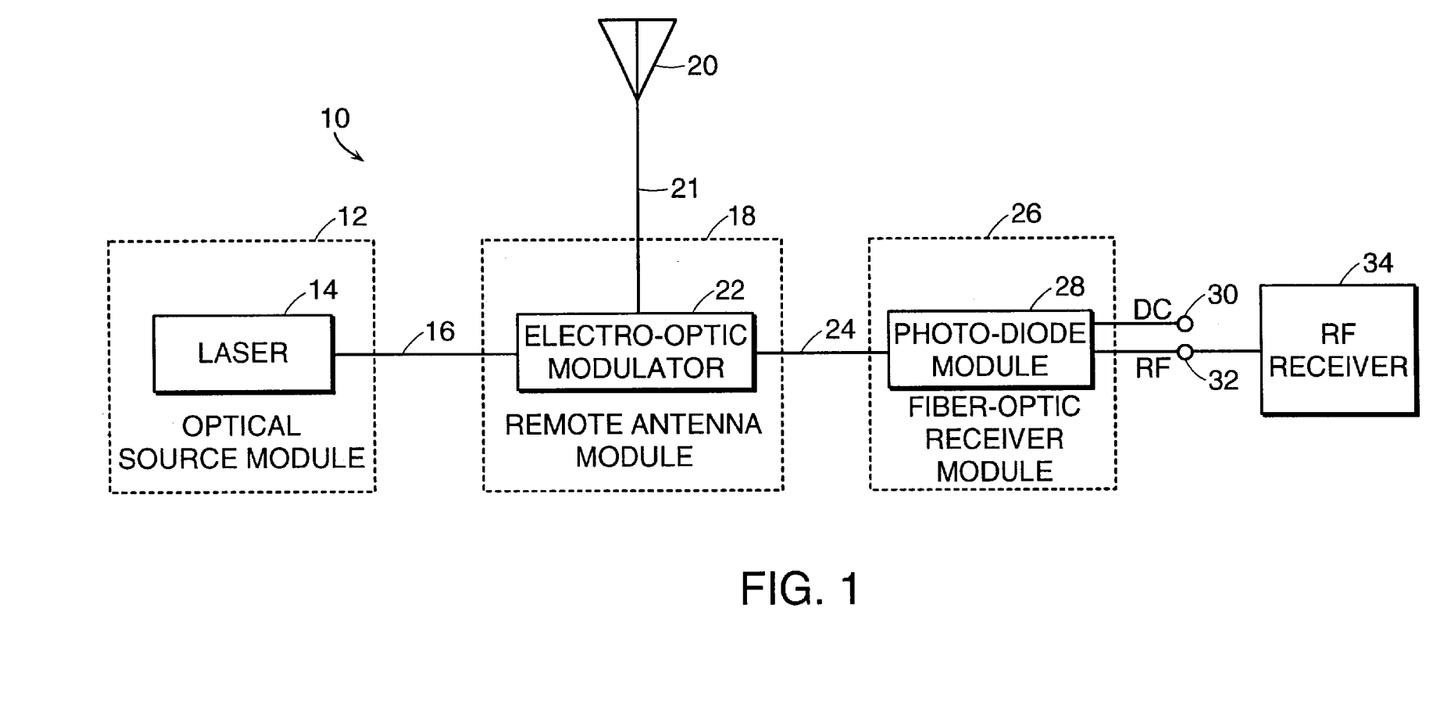
FIG. 1 is a functional block diagram illustrating an embodiment of an analog fiber optic link with a remote receiver antenna.

Referring to FIG. 1, a typical analog optical link 10 for use with a remote receiver antenna 20 includes an optical source module 12, a remote antenna module 18, and a fiber optic receiver module 26. The optical source module 12 includes a low noise solid state laser 14 for transmitting a CW optical carrier into a polarization maintaining optical fiber 16. The optical carrier is transmitted through the fiber 16 to an electro-optic modulator 22. An RF signal received at the antenna 20 for modulating the optical carrier is provided to the modulator 22 by an electrical conductor 21. The resulting modulated optical carrier is transmitted into a single mode optical fiber 24 and transmitted to a photodiode 28 in the fiber-optic receiver module 26 for conversion of the modulated optical signal to an electrical signal with a DC and an RF component at output terminals 30 and 32, respectively. The RF signal is provided to the input terminal of an RF receiver 34 for further processing.

Figure 2:
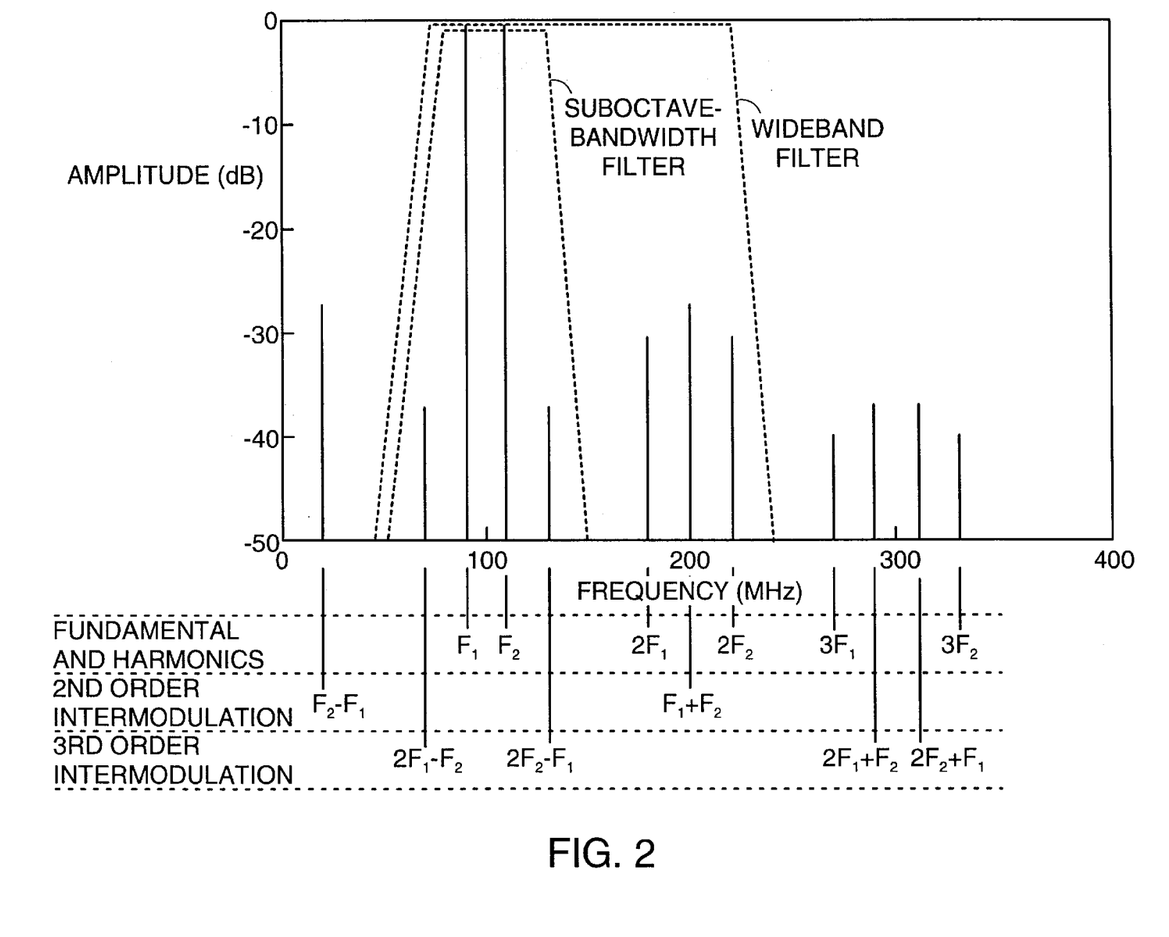
FIG. 2 illustrates harmonic and intermodulation distortion resulting from nonlinear modulation of two fundamental frequency signal tones closely spaced in frequency.

Linear modulation of the refractive index in the electro-optic modulator 22 does not generally result in a linear modulation of the optical power output by the modulator 22. This nonlinearity in the transfer function gives rise to distortion which includes the generation of harmonic and intermodulation distortion in the modulated signal. FIG. 2 illustrates the variety of second, third, and higher order distortion and intermodulation frequencies that are generated when a nonlinear device operates on the two closely spaced fundamental signal frequencies, F1 and F2, centered around a frequency of 100 MHz. In this example, the strongest distortion products remaining after suboctave filtering are at third-order intermodulation frequencies 2F1–F2 and 2F2–F1. Thus in this case the dynamic range is third-order limited.

The dynamic range of the externally modulated communications link 10 is not usually limited by second-order distortions for two reasons. First, if the operational bandwidth of the system 10 is less than a full octave, then second-order distortion generated by the modulator 22 can be electronically filtered from the signal after photodetection. Second, if the operational bandwidth is greater than one octave, then second-order distortion can be minimized by careful DC biasing of the modulator 22. More specifically, the electro-optic modulator 22 generally has an inflection point 150 on the transfer function 140 where the second derivative 142 of optical power output as a function of the input voltage is zero (see FIG. 4). DC biasing the modulator 22 to this voltage therefore cancels enough distortion at the second-harmonic frequencies (i.e., 2F1 and 2F2) and second-order intermodulation frequencies (i.e., F1+F2 and F1–F2) to allow third-order distortion products to dominate and thereby limit the dynamic range.

Figure 3:
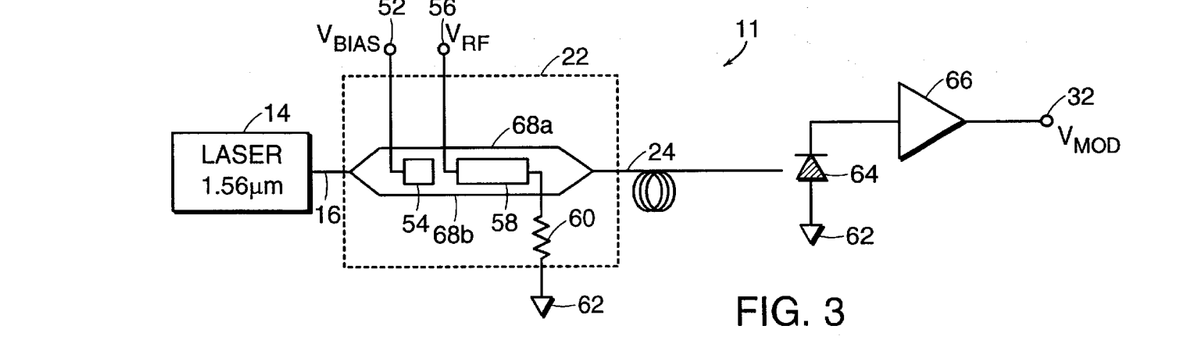
FIG. 3 is a functional block diagram of an embodiment of an analog optical link using a single-electrode Mach-Zehnder modulator.

Referring to FIG. 3, a standard analog optical link 11 with external modulation includes a Mach-Zehnder lithium niobate modulator 22 for modulating an optical carrier generated by a low-noise solid-state laser 14 operating at 1.56 $\mu$m. The modulator 22 is controlled by a DC bias voltage $V_{BIAS}$ applied to the DC bias terminal 52. The bias voltage $V_{BIAS}$ maintains the bias electrode 54 at the desired voltage level for operation according to the modulator transfer function. The modulator 22 is driven by a RF signal $V_{RF}$ from the antenna 20 applied to the RF voltage terminal 56. A signal electrode 58, connected to ground 62 through a resistive load 60, is controlled by the RF signal voltage $V_{RF}$. The refractive index of at least one of the single mode optical paths 68a, 68b varies linearly in response to the applied bias voltage $V_{BIAS}$ and the RF voltage $V_{RF}$, yielding a modulated optical signal in a single mode optical fiber 24. The modulated optical signal is converted to an electrical signal at a photodiode 64 and amplified with a low-noise amplifier 66 to provide a RF modulated electrical signal $V_{MOD}$ at the link output 32.

Figure 4:
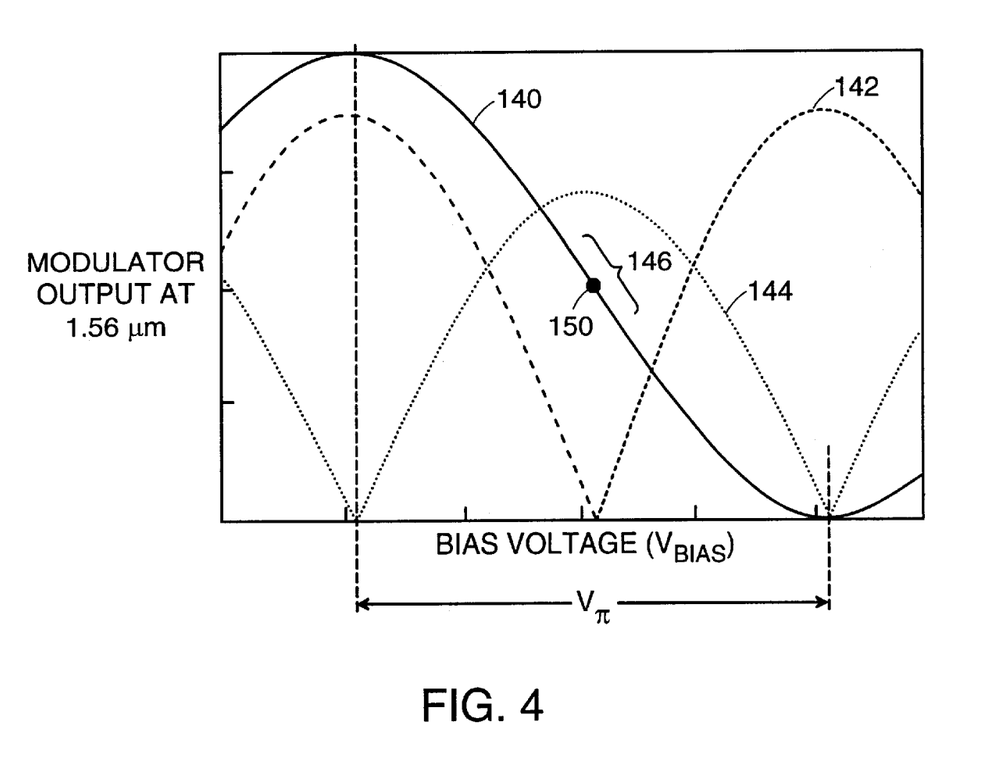
FIG. 4 is a plot of the transfer function and the second and third derivatives of optical output power as a function of bias voltage for the Mach-Zehnder external modulation link of FIG. 3.

FIG. 4 illustrates the characteristic interferometric output power versus applied voltage (i.e., transfer function) 140 for the modulator 22 of FIG. 3. Application of a DC bias voltage $V_{BIAS}$ is generally necessary in order to modulate an input signal $V_{RF}$ about a nearly linear portion 146 of the transfer function 140. Modulation nonlinearities are introduced by nonzero values of the second derivative 142 and third derivative 144 of the transfer function 140 as measured at the bias voltage $V_{BIAS}$.

Figure 5:
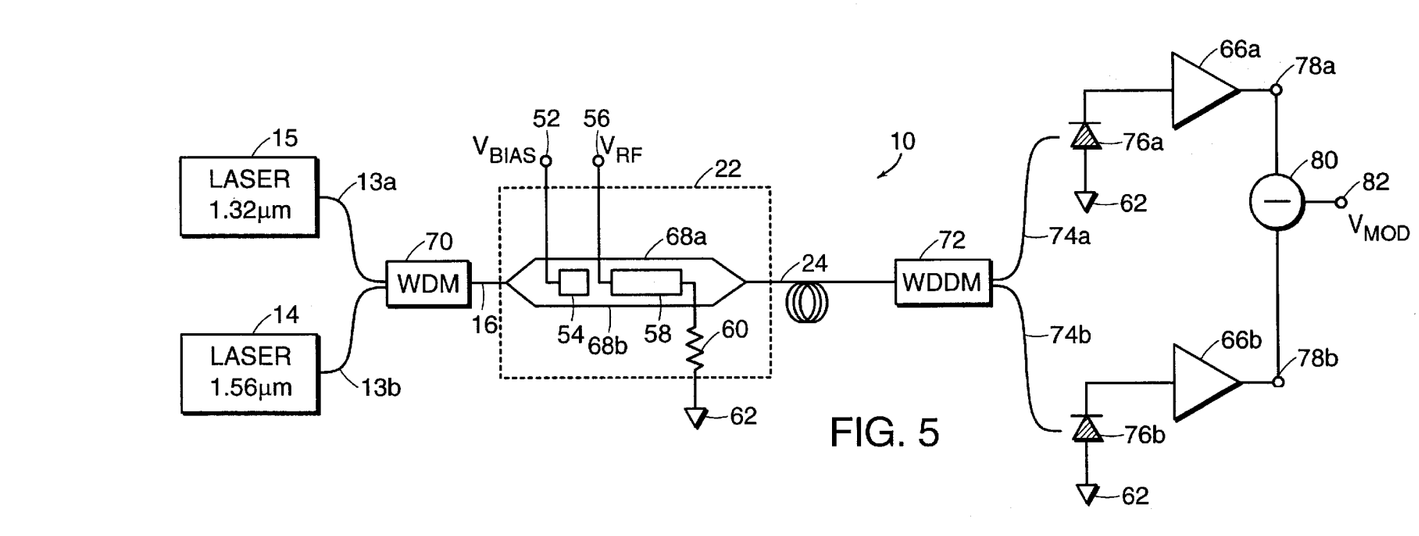
FIG. 5 is a functional block diagram of an embodiment of a linearized analog optical link using a single-electrode Mach-Zehnder linearized modulator.

In one embodiment of the present invention, an optical link 10 employing a Mach-Zehnder lithium niobate modulator 22 is used to modulate optical carriers generated by lasers 14, 15 operating at two different wavelengths (i.e., 1.32 μm and 1.56 μm) as shown in FIG. 5. The optical carrier provided by each laser 14, 15 is delivered by a respective polarization-maintaining optical fiber 13a,13b to a wavelength division multiplexer 70 wherein the two optical carriers are combined. The combined optical carriers are transmitted through a single polarization-maintaining optical fiber 16 to the modulator 22. The modulator 22 is biased by applying a DC bias voltage $V_{BIAS}$ to the DC bias terminal 52 for operation at the desired position on the modulator transfer function 140. The modulator 22 is driven by a RF signal $V_{RF}$ from the antenna 20 applied to the RF voltage terminal 56. A signal electrode 58, connected to ground 62 through a resistive load 60, is controlled by the RF signal voltage $V_{RF}$. The refractive index of at least one of the single mode optical paths 68a,68b varies linearly in response to the applied bias voltage $V_{BIAS}$ and the RF voltage $V_{RF}$, yielding a modulated combined optical signal in a single mode optical fiber 24. The combined modulated optical signals are separated at a wavelength division demultiplexer 72 and transmitted through a respective single mode optical fiber 74a,74b to a respective photodiode 76a,76b. The electrical signals generated by the photodiodes 76a,76b are amplified by respective low-noise amplifiers 66a,66b to generate differentially modulated electrical signals at the amplifier outputs 78a,78b. The two amplified electrical signals are then subtracted in a combiner 80 to yield a RF electrical signal $V_{MOD}$ at the output 82.

Figure 6A:
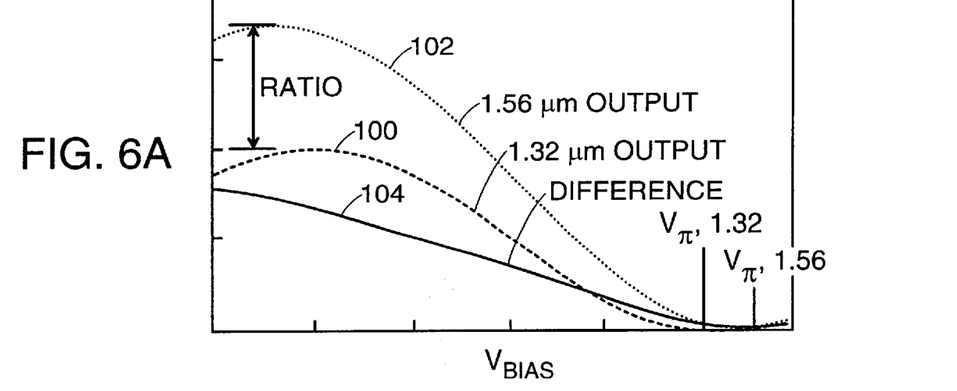
FIGS. 6A through 6C are plots of the transfer functions, second-order distortions and third-order distortions, respectively, for the linearized analog optical link of FIG. 5.
Figure 6B:
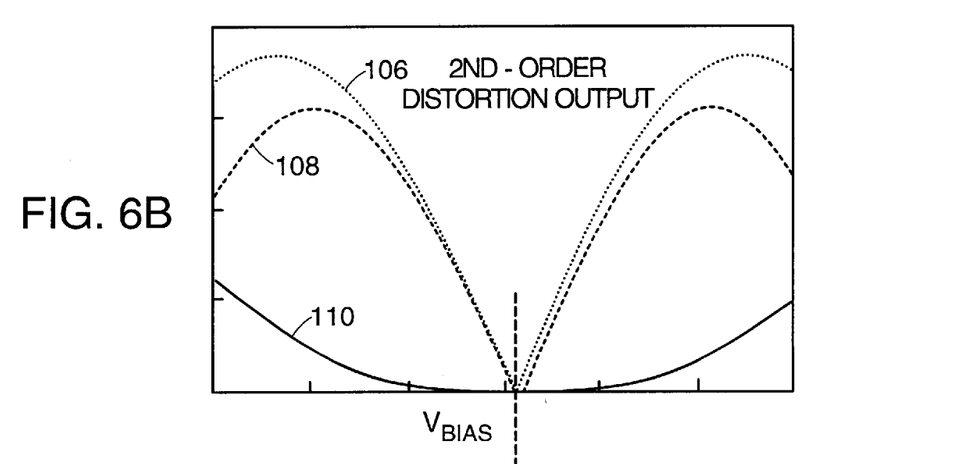
Figure 6C:
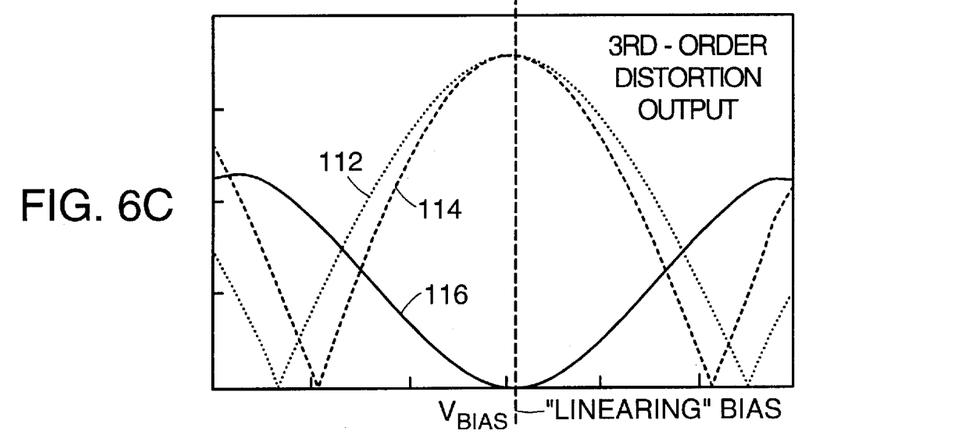

Because the halfwave voltage $V_\pi$ is essentially proportional to the optical wavelength, using a combination of wavelengths results in a transfer function 140 which can be designed to have null second and third derivatives 142,144 at a single DC bias voltage $V_{BIAS}$ for a given specific ratio of optical carrier power. For example, lasers 15,14 operating at 1.32 μm and 1.56 μm, respectively, will yield null second 142 and third derivatives 144 if the ratio of the optical carrier powers is maintained at 0.6058:1. The ratio can be monitored by comparing the average power of the two electrical signals at the amplifier outputs 78a,78b. An optical power correction feedback loop (not shown) can be used to increase or decrease the optical power of at least one of the laser sources 14,15 to maintain a stable power ratio. FIG. 6A illustrates the individual wavelength transfer functions 100, 102 and the linearized transfer function 104 for the modulator of FIG. 5 as defined at the amplifier outputs 78a,78b and link output 82, respectively. The linearized transfer function 104 is the difference of the two single wavelength transfer functions 100,102. Referring to FIGS. 6B and 6C, the second-order 106,108,110 and third-order distortion outputs 112,114,116 for the respective transfer functions of FIG. 6A are zero at a single bias voltage $V_{BIAS}$. In other implementations where the slopes of the single wavelength transfer functions 100,102 differ in sign, the two electrical signals at the amplifier outputs 78a,78b are added at the combiner 80 to yield a linearized transfer function 104.

Figure 7:
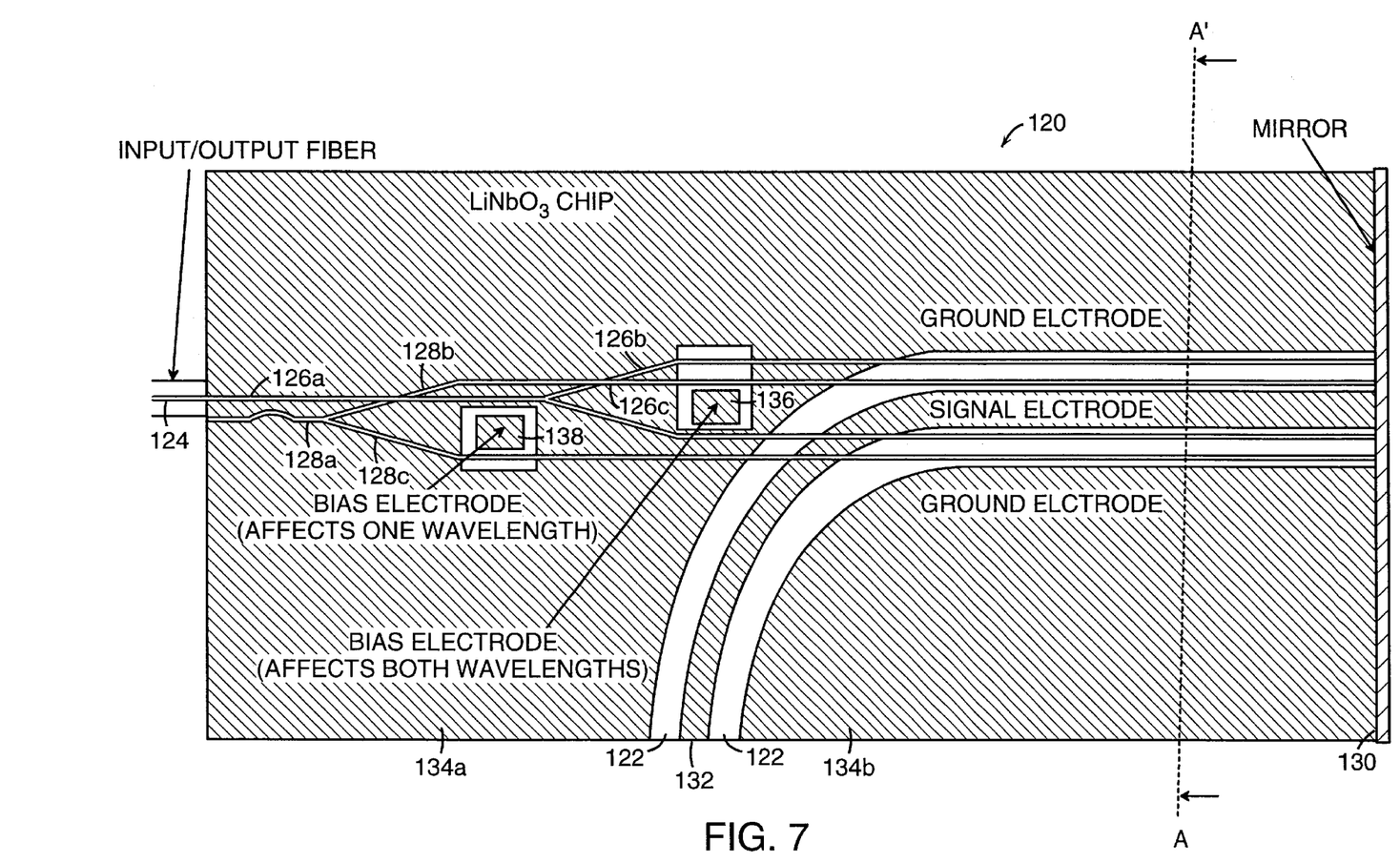
FIG. 7 is a plan view and FIG. 7A is a cross-sectional view through section A–A' of FIG. 7 of an embodiment of a dual-wavelength Mach-Zehnder modulator according to the invention.

Referring to FIG. 7 which has an expanded vertical dimension for clarity, a dual-wavelength Mach-Zehnder modulator 120 constructed in accordance with the invention utilizes a reflective traveling-waveguide design to double the electrical/optical interaction length. The modulator 120 includes a lithium niobate substrate 122 with embedded optical channels. A first optical channel 126a receives and transmits two optical signals at different wavelengths from an input/output optical fiber 124. A second optical channel 128a is configured to allow evanescent coupling of virtually all of the optical power at one wavelength into the channel 128a without significant coupling of optical power from the optical signal at the second wavelength. Each channel 126a, 128a is split into a first arm 126b,128b and a second arm 126c,128c which terminate at a reflective optical element 130. In one embodiment, the reflective optical element 130 is a mirror. The optical signal transmitted in each arm 126b,126c,128b,128c is incident on the reflective element 130 at a substantially normal angle and reflects back through the respective arms 126b,126c,128b,128c and channels 126a,128a. Optical power in channel 128a is virtually totally coupled back into channel 126a by evanescent coupling. The modulated optical signals are then output through the input/output fiber 124.

Figure 7A:
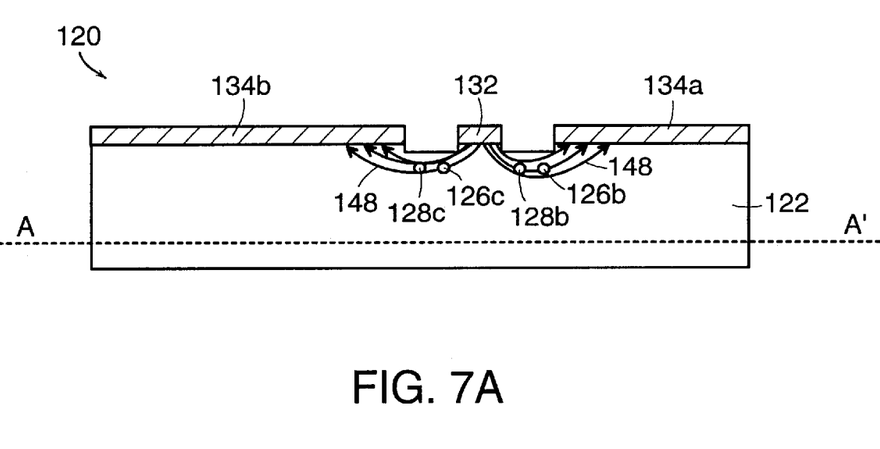

A signal electrode 132 driven by an RF voltage source (not shown) is disposed between a pair of ground electrodes 134a,134b. The first optical waveguide arms 126b,128b are disposed between the signal electrode 132 and one ground electrode 134a and the second optical waveguide arms 126c,128c are disposed between the signal electrode 132 and the other ground electrode 134b. Referring to FIG. 7A, an electric field 148 generated in the substrate 122 near the signal electrode 132 and the ground electrodes 134a,134b induces a change in the refractive index of the first arms 126b,128b and an opposite change in the refractive index of the second arms 126c,128c due to the orientation of the electric field.

Referring back to FIG. 7, a dual bias electrode 136 is located so as to create an electric field across the first arms 126b,128b in order to jointly control the bias point on the transfer functions 100,102 at the two wavelengths. An independent bias electrode 138 is located so as to create an electric field across only the second arm 128c at the second wavelength, thus the bias point on the second wavelength transfer function 102 can be controlled independently. Generally, the lengths of the two bias electrodes 136,138 are substantially shorter than the length of the signal electrode 132 because typically bias voltages can be applied at significantly higher voltages than those present at the signal electrode 132.

Figure 8:
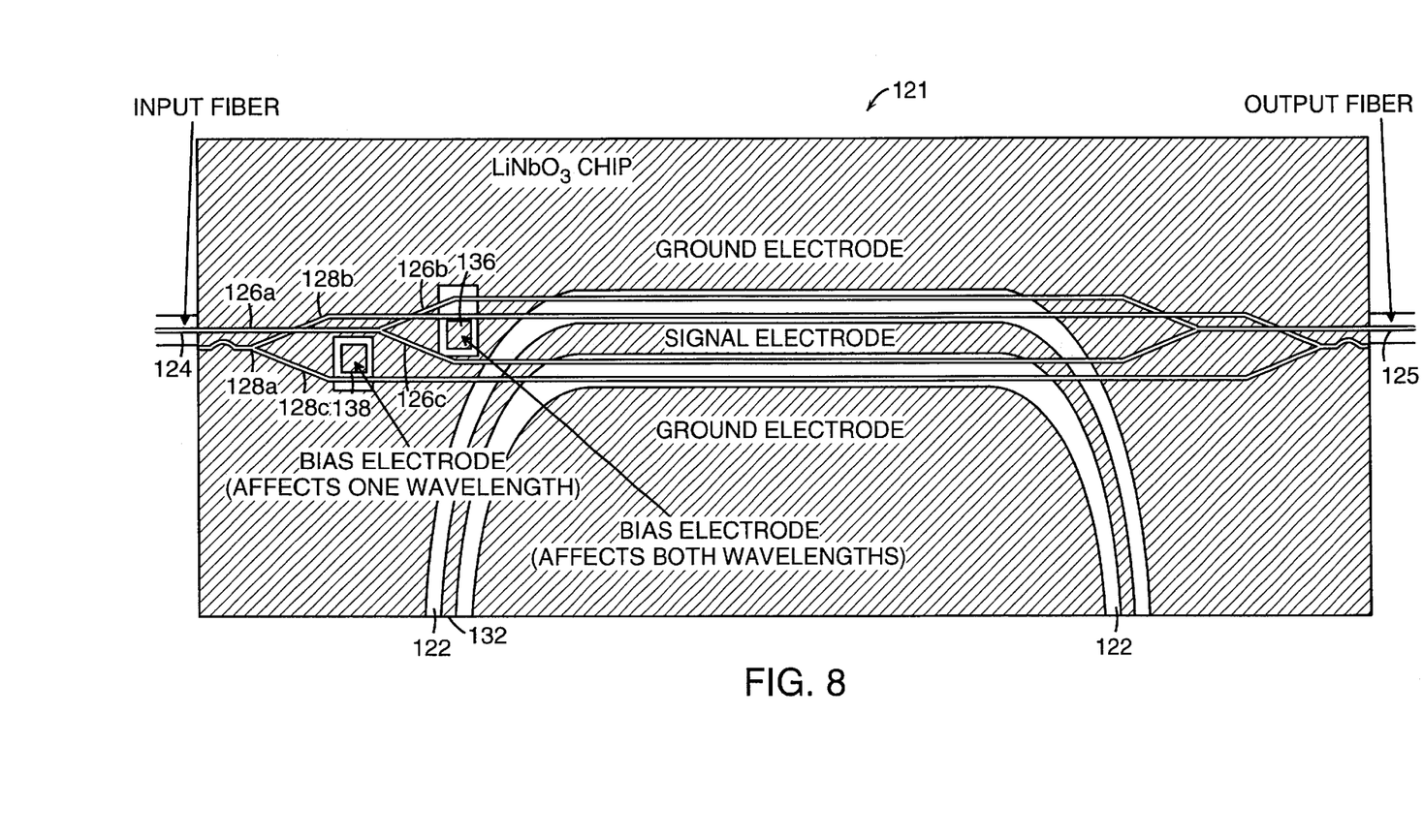
FIG. 8 is another plan view of an embodiment of a dual-wavelength Mach-Zehnder modulator according to the invention.

In another embodiment of the modulator 121, shown in FIG. 8, the reflective element 130 is absent, thus the two optical output signals are combined by evanescent coupling into a single output fiber 125 at the end of the modulator 121 opposite the input fiber 124. The general structure of the modulator 121 is similar to the modulator 120 in FIG. 7, however, the length of the modulator 121 is substantially increased in order to achieve a similar electrical/optical interaction length.

The modulator 120,121 has significant advantages over conventional single channel Mach-Zehnder modulators. First, the evanescent coupling for wavelength separation and combination eliminates the need for an external wavelength division demultiplexer 72. Second, independent and joint bias control allows the performance of the modulator 120 to be fine-tuned for a given application. Also, the modulator length can be substantially reduced by inclusion of a reflective optical element 130.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of linearizing a signal transmitted over a communication link, comprising the steps of:

supplying a first signal having a first wavelength;

supplying a second signal having a second wavelength;

modulating said first and second signals differentially with respect to each other to obtain a first modulated signal and a second modulated signal, respectively;

detecting said first modulated signal to obtain a first detected signal;

detecting said second modulated signal to obtain a second detected signal; and performing a linear operation on said first detected signal and said second detected signal to generate a received signal having substantially zero second-order modulator-induced distortion and zero third-order modulator-induced distortion.

2. The method of claim 1 further comprising the step of combining said first signal and said second signal to produce a combined signal prior to the step of modulating, wherein the step of modulating said first signal and said second signal differentially comprises modulating said combined signal.

3. The method of claim 2 further comprising the step of separating said differentially modulated combined signal prior to said steps of detecting said first modulated signal and detecting said second modulated signal.

4. The method of claim 1 wherein said first and second wavelengths are optical wavelengths.

5. The method of claim 1 wherein the step of performing a linear operation comprises summing said detected signals.

6. The method of claim 1 wherein the step of performing a linear operation comprises differencing said detected signals.

7. The method of claim 1 wherein said first signal has a first power and said second signal has a second power, and further comprising the step of adjusting said first power to establish a predetermined ratio of said first power and said second power.

8. A method of linearizing a received radio-frequency signal comprising the steps of:

supplying a first signal having a first wavelength;

supplying a second signal having a second wavelength;

modulating said first and second signals differentially with respect to each other in response to said received radio-frequency signal to obtain a first modulated signal and a second modulated signal;

detecting the first modulated signal to obtain a first detected signal;

detecting the second modulated signal to obtain a second detected signal; and performing a linear operation on said first and second detected signals to generate a received linearized signal having substantially zero second-order modulator-induced distortion and zero third-order modulator-induced distortion.

9. The method of claim 8 wherein said first signal has a first power and said second signal has a second power, and further comprising the step of adjusting said first power to establish a predetermined ratio of said first power and said second power.

10. A system for providing a linearized signal over a communication link, comprising:

a first source producing a first signal of a first wavelength at a first source output;

a second source producing a second signal of a second wavelength at a second source output;

a modulator having a first modulator input in communication with said first source output, a second modulator input in communication with said second source output, a first modulator output and a second modulator output, wherein said modulator differentially modulates said first and second signals from said first source output and said second source output, respectively, to produce a modulated first signal and a modulated second signal;

a first detector in communication with said first modulator output and having a first detector output, said first detector producing a first electrical signal at said first detector output in response to said modulated first signal;

a second detector in communication with said second modulator output and having a second detector output, said second detector producing a second electrical signal at said second detector output in response to said modulated second signal; and a processor having a first processor input in electrical communication with said first detector output, a second processor input in electrical communication with said second detector output, and a processor output, wherein said processor performs a linear operation on said first and second electrical signals to generate a linearized output signal having substantially zero second-order modulator-induced distortion and zero third-order modulator-induced distortion at said processor output in response to said first and second electrical signals.

11. The system of claim 10 wherein said modulator further comprises a wavelength division multiplexer having a first multiplexer input in communication with said first source output, a second multiplexer input in communication with said second source output, and a multiplexer output.

12. The system of claim 10 further comprising a wavelength division demultiplexer, said wavelength division demultiplexer producing said modulated first signal and said modulated second signal.

13. The system of claim 10 wherein said first and second wavelengths are optical wavelengths.

* * * * *